(12) United States Patent
Adams

(10) Patent No.: US 9,066,051 B2
(45) Date of Patent: Jun. 23, 2015

(54) LUMINOUS PRINTING

(76) Inventor: Wesley T. Adams, Los Angeles, CA (US)

(*) Notice: Subject to any disclaimer, the term of this patent is extended or adjusted under 35 U.S.C. 154(b) by 463 days.

(21) Appl. No.: 12/956,234

(22) Filed: Nov. 30, 2010

(65) Prior Publication Data

US 2011/0216372 A1 Sep. 8, 2011

Related U.S. Application Data

(60) Provisional application No. 61/310,710, filed on Mar. 5, 2010.

(51) Int. Cl.
| | |
|---|---|
| *H04N 1/60* | (2006.01) |
| *H04N 1/54* | (2006.01) |
| *B42D 25/387* | (2014.01) |
| *G03G 15/00* | (2006.01) |
| *B41M 3/14* | (2006.01) |

(52) U.S. Cl.
CPC ............ *H04N 1/54* (2013.01); *H04N 2201/327* (2013.01); *H04N 1/6027* (2013.01); *B42D 25/387* (2014.10); *G03G 15/6585* (2013.01); *H04N 1/6016* (2013.01); *B41M 3/144* (2013.01)

(58) Field of Classification Search
None
See application file for complete search history.

(56) References Cited

U.S. PATENT DOCUMENTS

| | | | | |
|---|---|---|---|---|
| 5,422,738 | A * | 6/1995 | Ishihara et al. | 358/500 |
| 7,126,610 | B2 * | 10/2006 | Hammond | 345/589 |
| 7,230,738 | B2 * | 6/2007 | Zhang et al. | 358/1.9 |
| 7,764,403 | B2 * | 7/2010 | Loce et al. | 358/3.28 |
| 8,125,688 | B2 * | 2/2012 | Watanabe | 358/1.9 |
| 2002/0122190 | A1 * | 9/2002 | Harrington | 358/1.9 |
| 2004/0233465 | A1 * | 11/2004 | Coyle et al. | 358/1.9 |
| 2006/0188308 | A1 * | 8/2006 | Tanaka et al. | 400/62 |
| 2008/0052023 | A1 * | 2/2008 | Kettler | 702/82 |
| 2009/0097028 | A1 * | 4/2009 | Vogh, Jr. | 356/407 |
| 2009/0097046 | A1 * | 4/2009 | Ohta et al. | 358/1.9 |
| 2009/0136088 | A1 * | 5/2009 | Tabata | 382/100 |
| 2009/0237684 | A1 * | 9/2009 | Watanabe | 358/1.9 |
| 2010/0157377 | A1 * | 6/2010 | Zhao et al. | 358/3.28 |

* cited by examiner

*Primary Examiner* — Richard Zhu
(74) *Attorney, Agent, or Firm* — James A. Italia; Italia IP

(57) ABSTRACT

A method and a device are disclosed for luminous printing of an original image using fluorescent ink or other fluorescent display pigments. In some embodiments, the original image is separated into multiple layers, including at least a brightness layer and an inverse brightness (or darkness) layer, by applying extracted brightness data and inverse brightness data, to the original image, respectively. Each of the layers is associated with a set of corresponding printing channels. The sets of printing channels are applied by a printing device to print the original image on a print medium, such as paper, mylar, fabric, and other print surfaces. Multiple visual effects may be realized using the aforementioned process, including fluorescent images that are only visible under UV (Ultra Violet) or black light, images with high-fidelity colors under daylight and dark conditions, and shadow effects such as depth illusion.

10 Claims, 15 Drawing Sheets

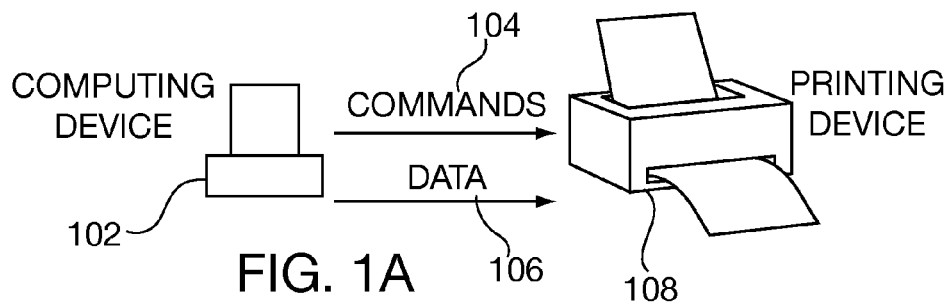
FIG. 1A
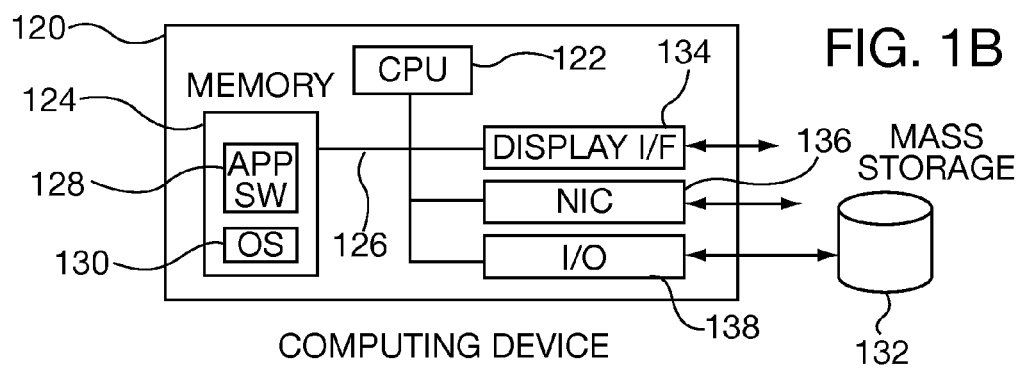
FIG. 1B
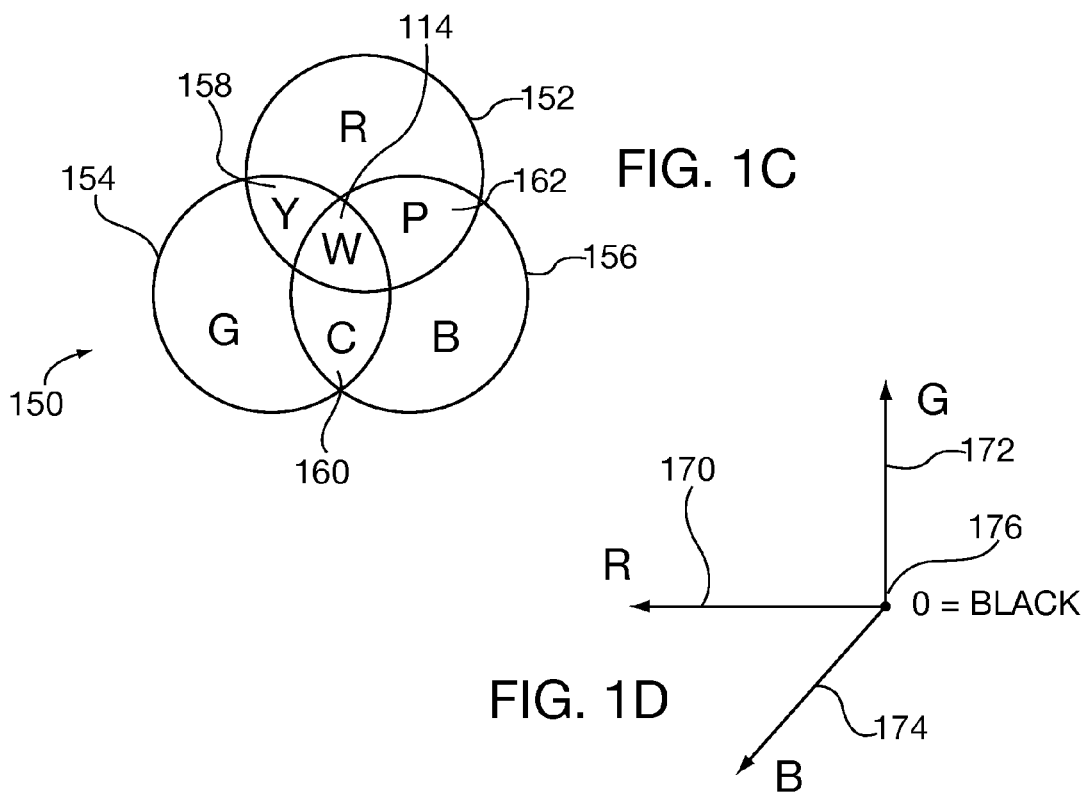
FIG. 1C
FIG. 1D

LUMINOUS PRINTING

CROSS-REFERENCE TO RELATED APPLICATION

This application claims the benefit of the filing date under 35 USC 119(e) of the filing date of U.S. Provisional Application Ser. No. 61/310,710, filed Mar. 5, 2010, the contents of which are incorporated herein by reference.

TECHNICAL FIELD

This application relates generally to a printing process. More specifically, this application relates to luminous printing process using different image layers and corresponding sets of color channels.

SUMMARY

In aspects of present disclosure, a method of printing images is disclosed including separating the original image into multiple layers, associating a different set of channels with each of the multiple layers, where the different set of channels are configured to be used to generate a printed image that looks substantially equivalent under daylight conditions and Ultra Violate (UV) black light conditions. The method further includes printing each of the multiple layers using the corresponding set of channels.

In further aspects of the present disclosure, a method of printing images is disclosed including separating the original image into multiple layers, associating a different set of channels with each of the multiple layers, wherein the different set of channels are configured to be used to generate a printed image that is substantially invisible under normal daylight and visible in substantially full and accurate color under Ultra Violate (UV) black light. The method further includes printing each of the multiple layers using the corresponding set of channels.

In still further aspects of the present disclosure, a printing system is disclosed including a printing press configured to print images, and a computing device coupled with the printing press. The computing device is configured to digitally separate an original image into multiple layers, associate a different set of channels with each of the multiple layers, wherein the different sets of channels are configured to be used to generate a printed image that looks substantially equivalent under daylight conditions and Ultra Violate (UV) black light conditions. The computing device is configured to print each of the multiple layers using the corresponding set of channels.

BRIEF DESCRIPTION OF THE DRAWINGS

The drawings, when considered in connection with the following description, are presented for the purpose of facilitating an understanding of the subject matter sought to be protected.

FIG. 1A is a diagram of an example system for printing images on a printing device;

FIG. 1B is a diagram of example components of a computing device;

FIG. 1C is an example diagram of a Red-Green-Blue (RGB) color space;

FIG. 1D is an example diagram of the RGB additive color model;

DETAILED DESCRIPTION

Figure 2A:
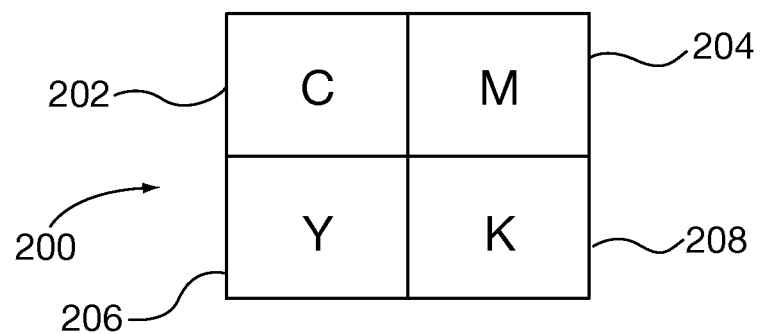
FIG. 2A is an example diagram of a Cyan-Magenta-Yellow-Black (CMYK) color space.

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while following description references printing on physical surfaces such as paper, fabric, and plastic, it will be appreciated that the disclosure may be used for other image processing and display applications such as televisions, computer monitors, projectors, and the like.

Briefly described, a method and a device are disclosed for luminous printing of an original image using fluorescent ink or other fluorescent display pigments. In some embodiments, the original image is separated into multiple layers, including at least a brightness layer and an inverse brightness (or darkness) layer, by applying extracted brightness data and inverse brightness data, to the original image, respectively. Each of the layers is associated with a set of corresponding printing channels. The sets of printing channels are applied by a printing device to print the original image on a print medium, such as paper, mylar, fabric, and other print surfaces. Multiple visual effects may be realized using the aforementioned process, including fluorescent images that are only visible under UV (Ultra Violet) or black light, images with high-fidelity colors under daylight and dark conditions, and shadow effects such as depth illusion.

Printing is a ubiquitous part of the modern life. Color printing of images is now widely available to all users, professional and amateur alike, via modern printing devices, such as ink-jet printers, laser printers, and the like. Color printing is especially important in commercial advertisements, printed matter and periodicals, commercial signs and displays, and entertainment, among others. Commercial print jobs are generally processed via a printing press for quality and cost reasons.

To effectively work with colors, many color systems have been devised, each for particular types of applications. For example, Red-Green-Blue (RGB), Cyan-Magenta-Yellow-Black (CMYK), and many other variations, are color spaces that are in common use. Color spaces are closely related to color models, which are mathematical models that related different colors to each other for easy reference and analysis. A color space is generally defined in terms of a few base colors (such as red, green, blue in RGB) and all other colors in that space are defined in terms of the various combinations of the intensities of the base colors. For example, red and green generate yellow.

Color models may be additive, like RGB, or subtractive, like CMYK. In additive color spaces, a base color that is emitted causes a resulting color to be generated, while in subtractive color spaces, a base color that subtracts other reflected color from a white background, which is a mixture of all colors. CMYK is often used in printing processes. Color spaces and models are further described below with reference to FIGS. 1C and 1D.

Half-toning or quarter-toning of light and/or colored pigments reduces the light and/or color density on a projection and/or print surface on which light is shone and/or color is printed by some percentage, respectively. That is, half-toning reduces color saturation on a print surface. Tiny dots of each primary (or basic) color may be printed in a pattern small enough that human eye perceives as a solid color. For example, magenta printed with a 20% halftone on white paper generates a pink color because the magenta dots and the white space between the dots are collectively perceived as lighter and/or less saturated than pure magenta. Without half-toning, the three primary process colors may be printed only as solid colors, limiting the resulting combinations to only three additional colors. Utilizing half-toning, a substantially continuous range of colors may be generated.

Colors may be treated as signals because a color is basically specified by a particular frequency and/or wavelength of light waves. As such, signal processing concepts and techniques are generally applicable to color images and color processing. Colors also have certain characteristics, such as lightness and brightness, which help in the understanding color processing. Lightness of a color is the perception of color that ranges from black, through gray, to white, under the same lighting conditions and regardless of the hue. The physical counterpart of lightness is reflectance, the permanent property of a surface that determines what portion of incident light the surface reflects. For example, surfaces that appear white reflect about 90% of the light striking them. Black surfaces reflect about 3%. In short, lightness is perceived reflectance.

Brightness is the perception of color that ranges from dim to bright, under the same lighting conditions and regardless of the hue. Like lightness, brightness is a perceptual term. The physical counterpart of brightness is luminance—that is, the absolute intensity of light reflected in the direction of the observer's eye by a surface. In short, if lightness is perceived reflectance, brightness is perceived luminance. The reflectance of an object is a relatively permanent property, whereas its luminance is transient.

FIG. 1A is a diagram of an example system for printing images on a printing device. In one embodiment, the example printing system includes a computing device 102, sending commands 104 and data 106 to a printing device 108 to print images on a print surface 110. In some embodiments, computing device 102 is a general purpose computer or a dedicated terminal for use with the printing device. The image to be printed is typically preprocessed on computing device 102 and is then transmitted in the form of digital or analog data 106 to printing device 108. Depending on the interface of the printing device, commands 104 may be transmitted to printing device 108 to process received data 106 before printing on print media such as paper, fabric, mylar, and the like. Commands 104 vary greatly depending on the printing device interface and typically include commands about various print media to use, orientation of the printed image, quality of print, and the like. Those skilled in the art will appreciate that other embodiments of printing systems are possible without departing from the spirit of the present disclosures. For example, data and/or commands may be directly loaded onto the printing device via a keypad, a data tape, a disc, or other computer readable media, without a computer interface.

FIG. 1B is a diagram of example components of a computing device. In some embodiments, computing device 102 of FIG. 1A is substantially the same as computing device 120, which may include a Central Processing Unit (CPU) 122, coupled via a control and/or data bus 126 to other functional units such as memory 124, display interface 134, Network Interface Card (NIC) 136, Input/Output (I/O) 138, and mass storage device 132. Memory 124 may include an Operating System (OS) 130, application software 128, and other types of computer-executable software components, such as device drivers for peripheral devices like printing and mass storage devices. Those skilled in the art will appreciate that computing device 120 may include fewer, more, different, more integrated, and/or functionally separated components than the illustrative components shown in FIG. 1B. Computing device 120 may be used to execute application programs such as image processing applications, color processing applications, and printing applications.

FIG. 1C is an example diagram of a Red-Green-Blue (RGB) color space. The base colors are generally shown as overlapping color sets 152 for red, 154 for green, and 156 for blue. The overlaps between the base color sets show different colors resulting from the combination of the base colors. For example, yellow 158, cyan 160, and pink 162. A full spectrum of colors may be generated by the base colors based on the intensity of each base color in the combination. In various embodiments, the base colors may take any intensity value in a predetermined range such as 1 to 255, represented in digital computers by an 8-bit (one byte) quantity. Depending on the particular value of the base colors RGB in a particular combination, a different color is generated. For example, for the set $\{R, G, B\}=\{186, 22, 50\}$ (where: R=186, G=22, B=50), one color is generated, while for the set $\{R, G, B\}=\{15, 85, 204\}$, a different color is generated. Colors in a color image may be represented and/or encoded using RGB. The RGB values form a 3-dimensional space as further described below with respect to FIG. 1D.

FIG. 1D is an example diagram of the RGB additive color model. RGB may be modeled by a Cartesian system in which each of the base colors R, G, and B, constitutes one of the dimensions, 170, 172, and 174, respectively. The origin of this system where $\{R, G, B\}=\{0, 0, 0\}$ corresponds to the black color and $\{R, G, B\}=\{255, 255, 255\}$ corresponds to the white color, if the range of values for the base colors is defined as 1 to 255. RGB color model is additive because starting with no color (black), the base colors are added to zero colors to generate other colors. This is in contrast to subtractive models where starting with all colors (white), the base colors are subtracted from the mix of all colors to generate other colors.

FIG. 2A is an example diagram of a Cyan-Magenta-Yellow-Black (CMYK) color space. CMYK color space 200 has four base colors that when combined with different intensities generate different colors. In a similar manner to RGB, the base colors of CMYK, Cyan 202, magenta 204, yellow 202, and black 208 are combined in different proportions to generate different colors.

Figure 2B:
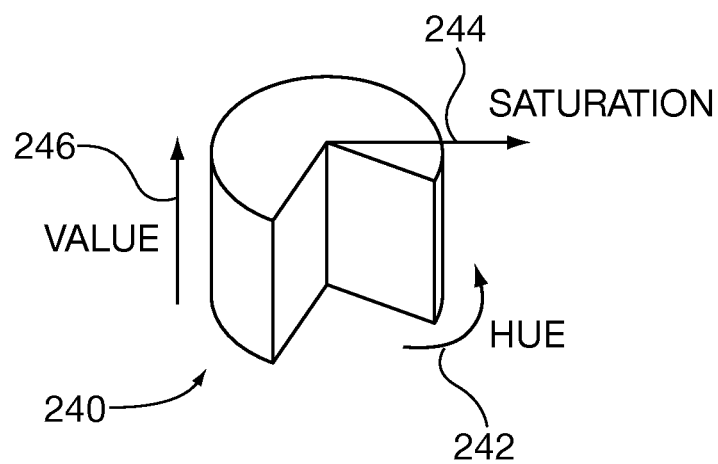
FIG. 2B is an example diagram of the CMYK subtractive color model.

FIG. 2B is an example diagram of the CMYK subtractive color model. In a subtractive color model, starting with all colors (white), the base colors are subtracted from the mix of all colors to generate other colors. A cylindrical coordinate system may be used to model the CMYK color space. Each point in a cylindrical coordinate system is specified using three coordinates consisting of one angle around the cylinder 242, the distance from the center of the cylinder 244, and the length of the cylinder 246. In Hue-Saturation-Value (HSV), angle 242 may be used to represent the hue "dimension", while distance from the center 244 and length of the cylinder 246 are used to represent saturation and value, respectively. In other similar representation, the value may be replaced with lightness (HSL) or intensity (HSI).

Those skilled in the art will appreciate that there are many other color spaces, such as YUV, YCbCr, YPbPr, and the like, that are used in different applications like television and video color systems.

Figure 3A:
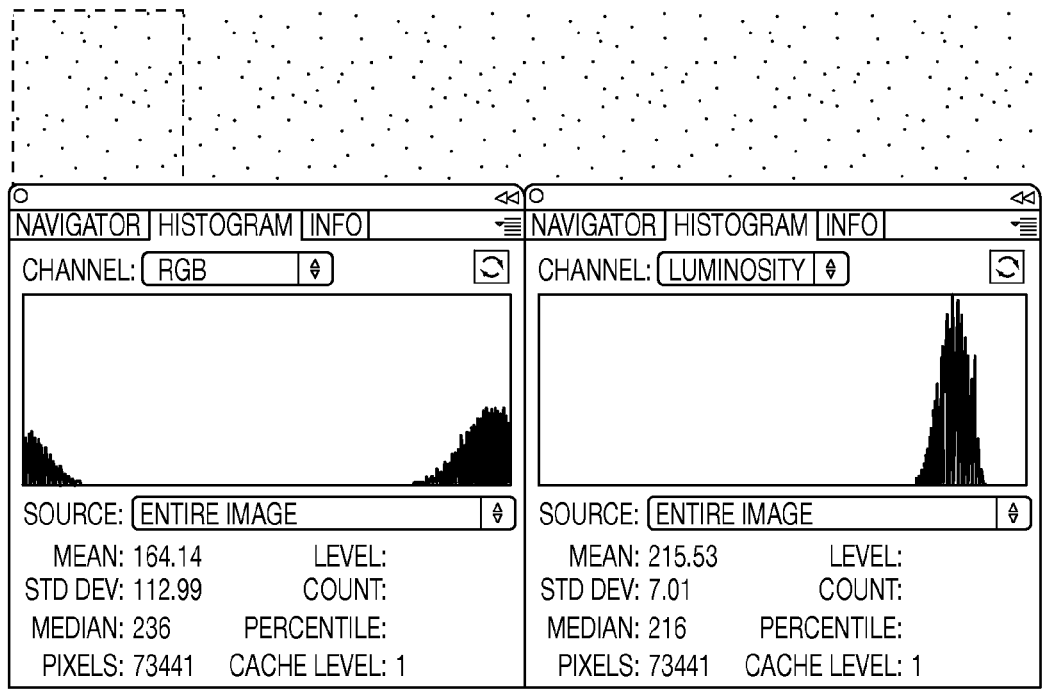
FIGS. 3a-3f show examples of invariant luminosity under daylight with respect to different fluorescent and non-fluorescent yellow (actual color not shown) color proportions.
Figure 3B:
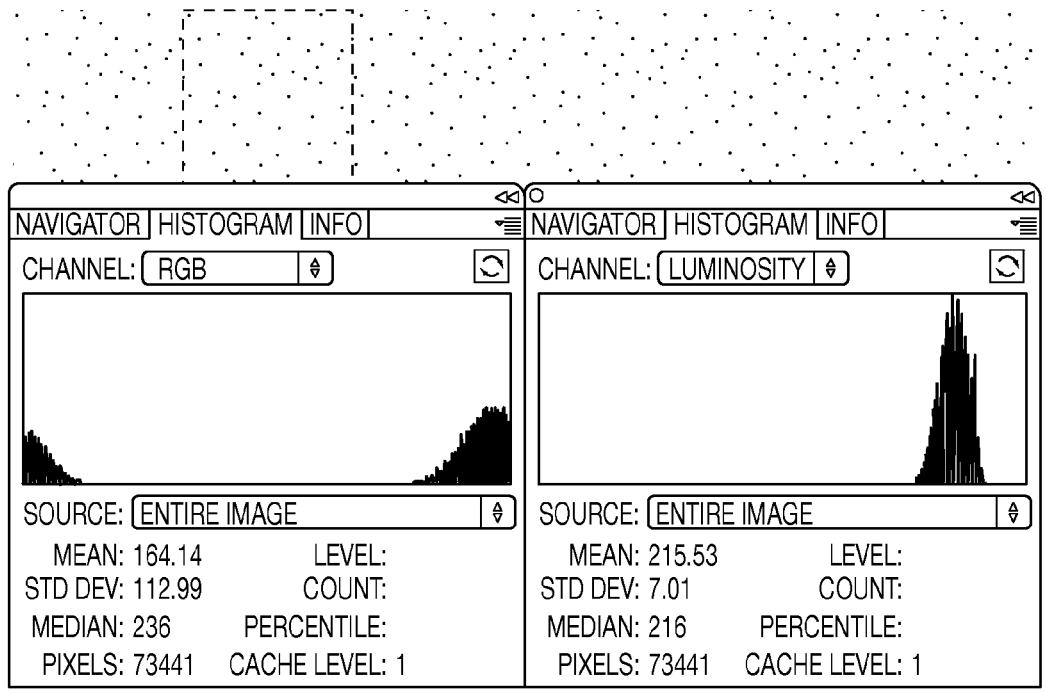
Figure 3C:
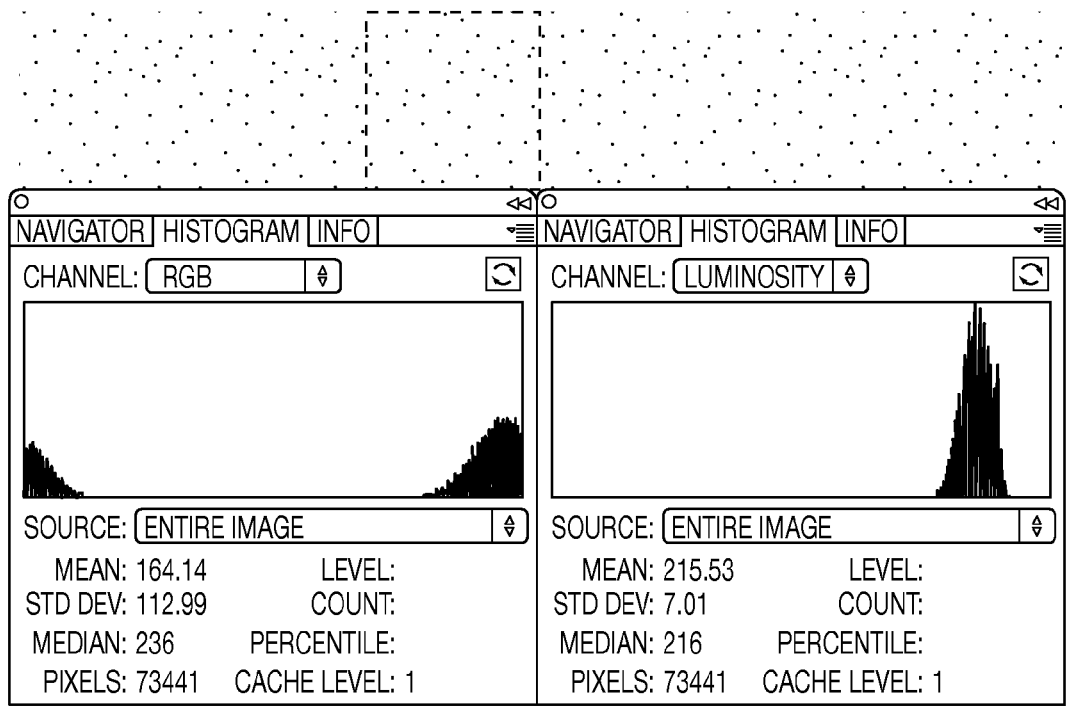
Figure 3D:
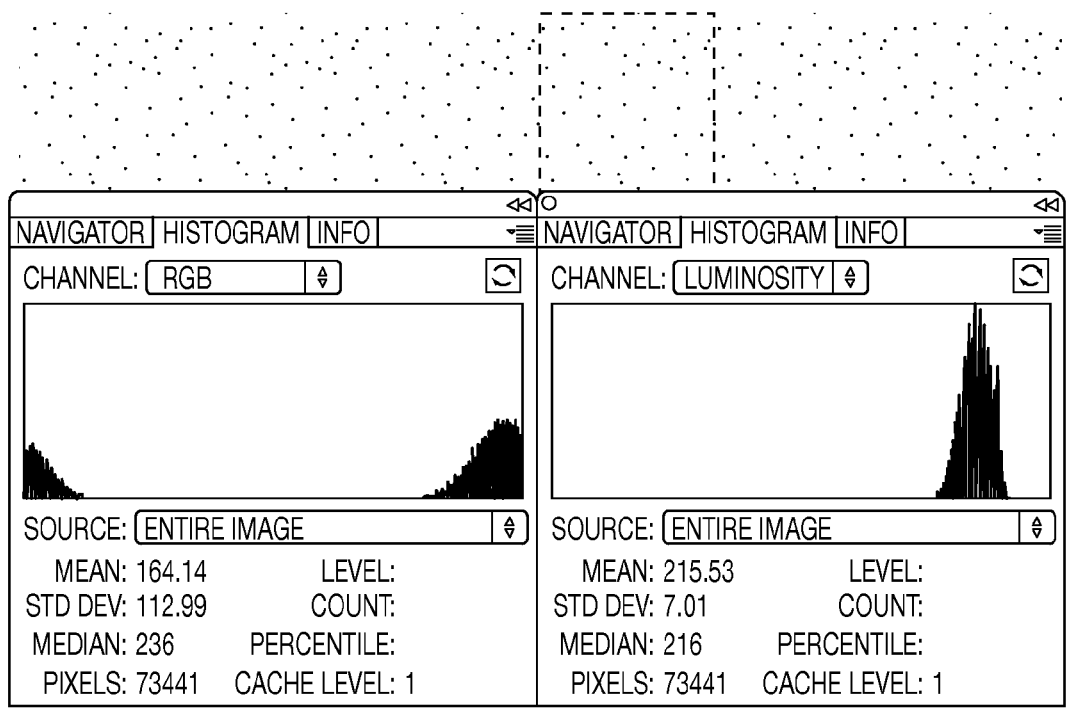
Figure 3E:
Figure 3E:
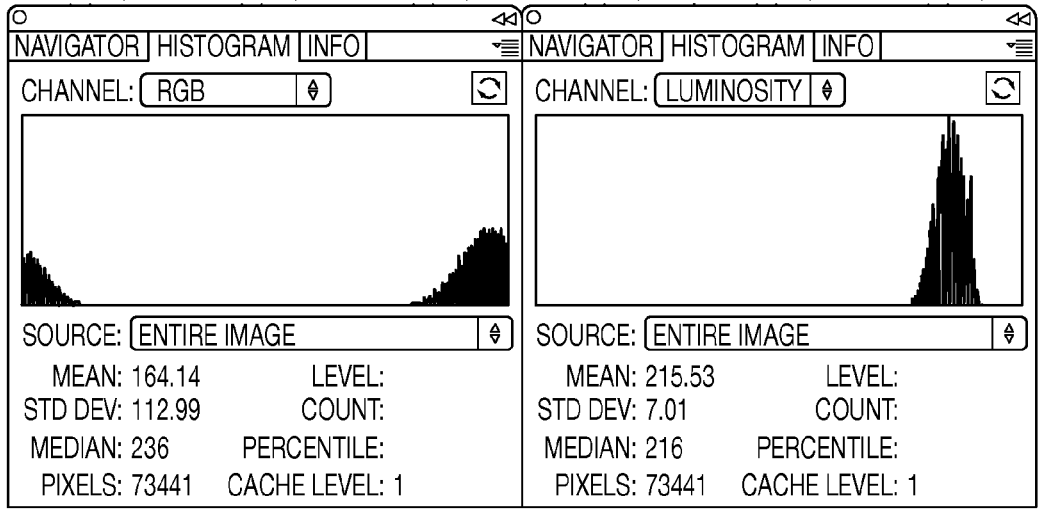
Figure 3F:
Figure 3F:
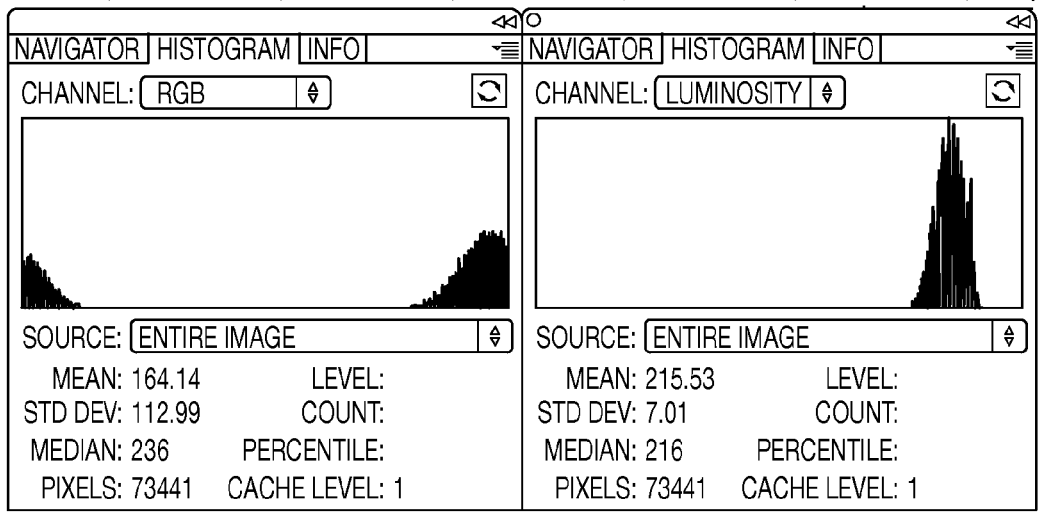
Figure 4A:
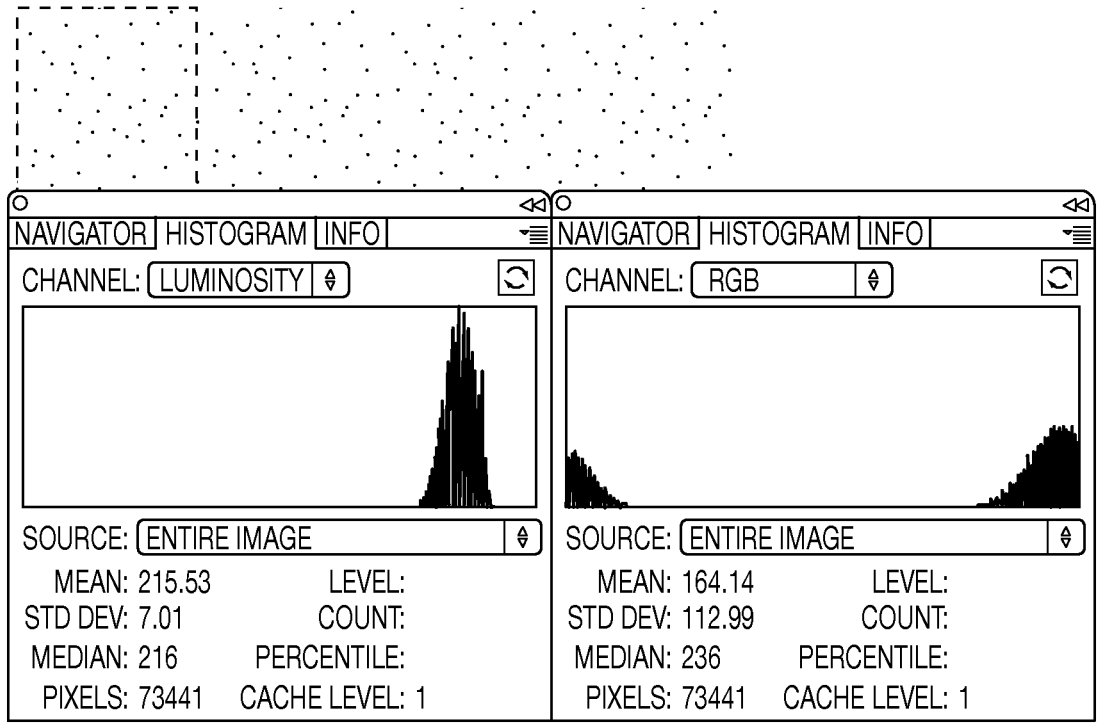
FIGS. 4a-4d show examples of invariant luminosity under daylight with respect to different yellow fluorescent and white color proportions.
Figure 4B:
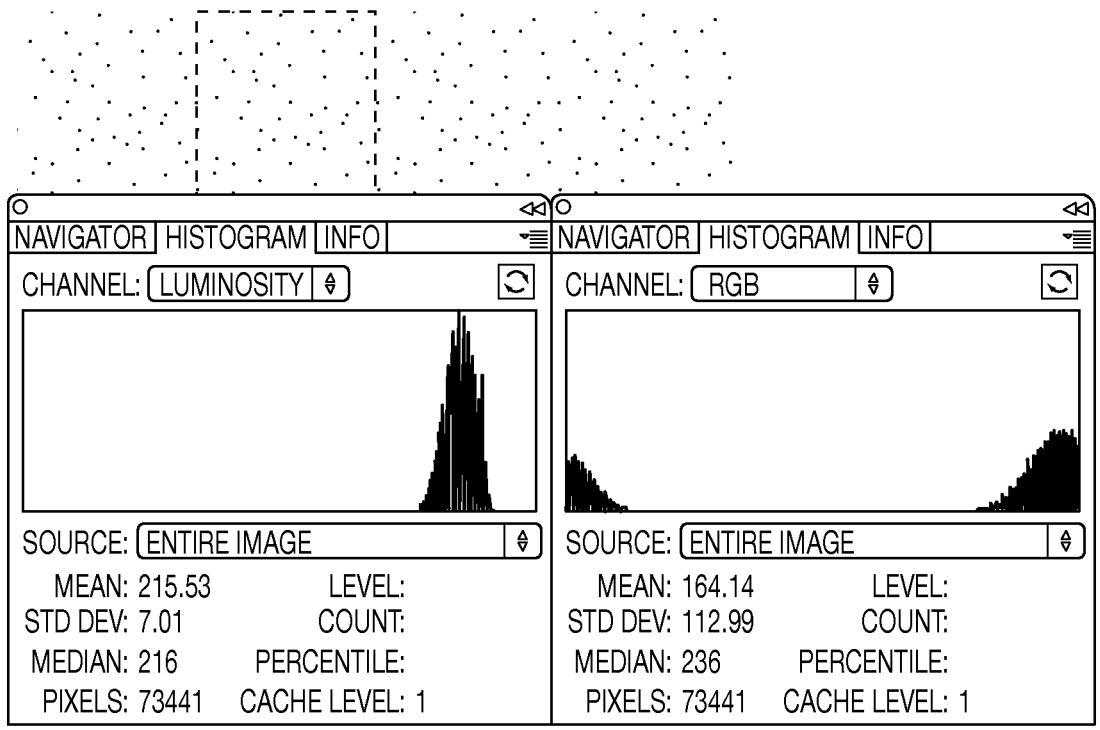
Figure 4C:
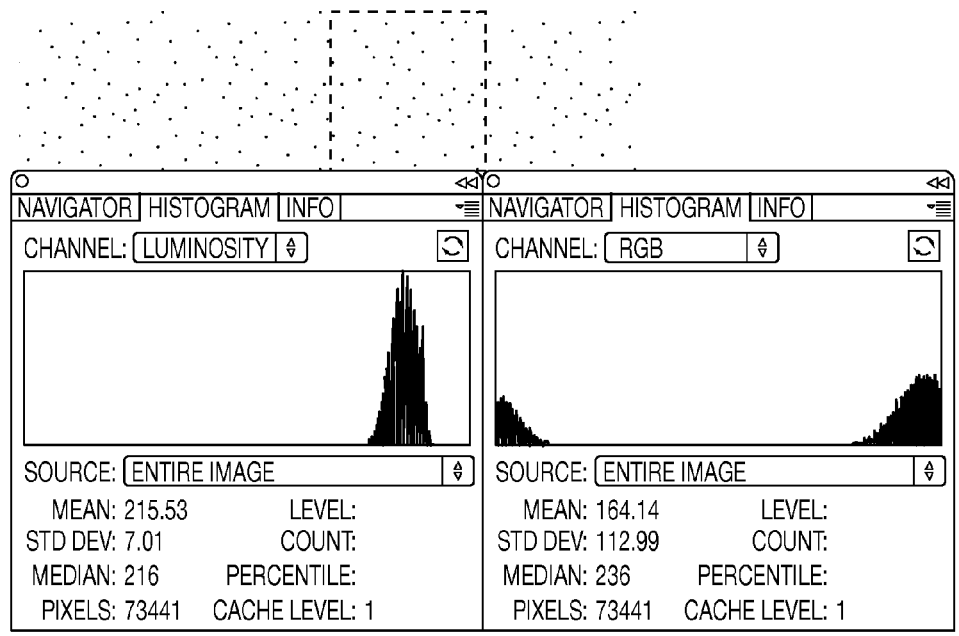
Figure 4D:
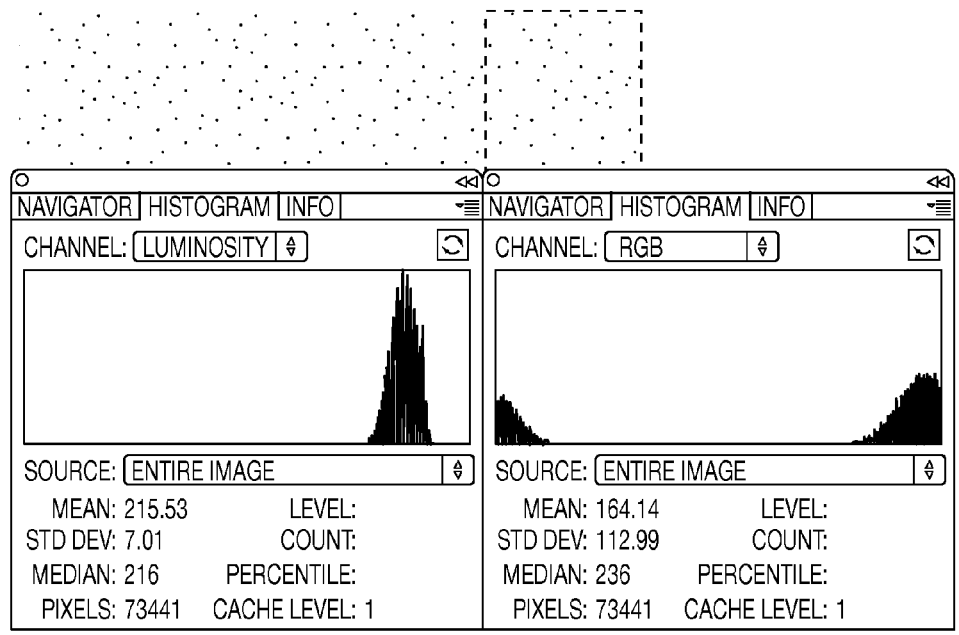
Figure 5A:
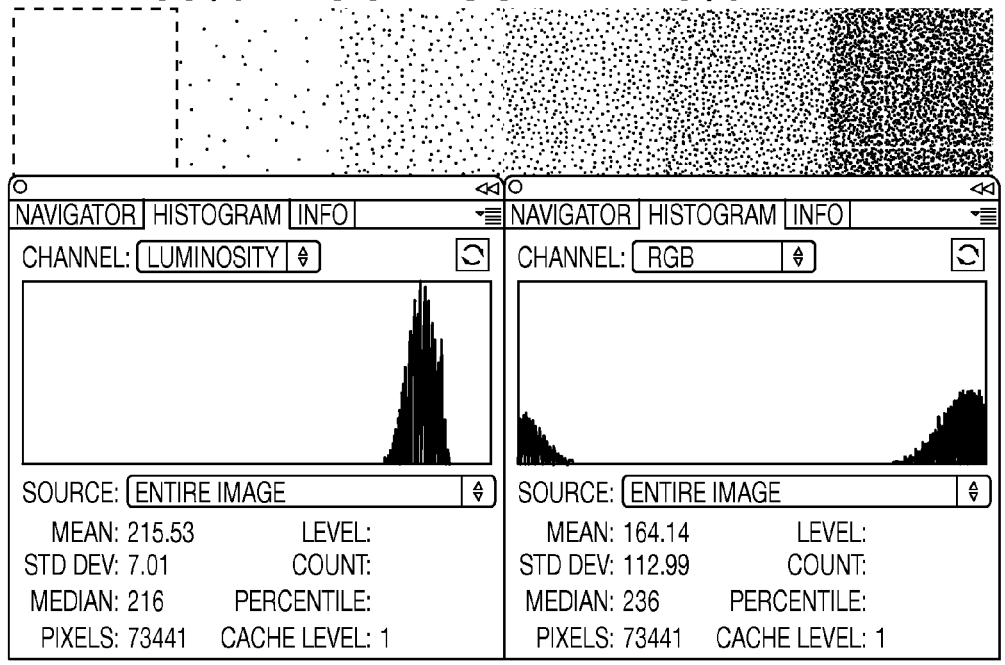
FIGS. 5a-5f show examples of variable luminosity under dark lighting conditions with respect to different fluorescent and non-fluorescent yellow (actual color not shown) color proportions.
Figure 5B:
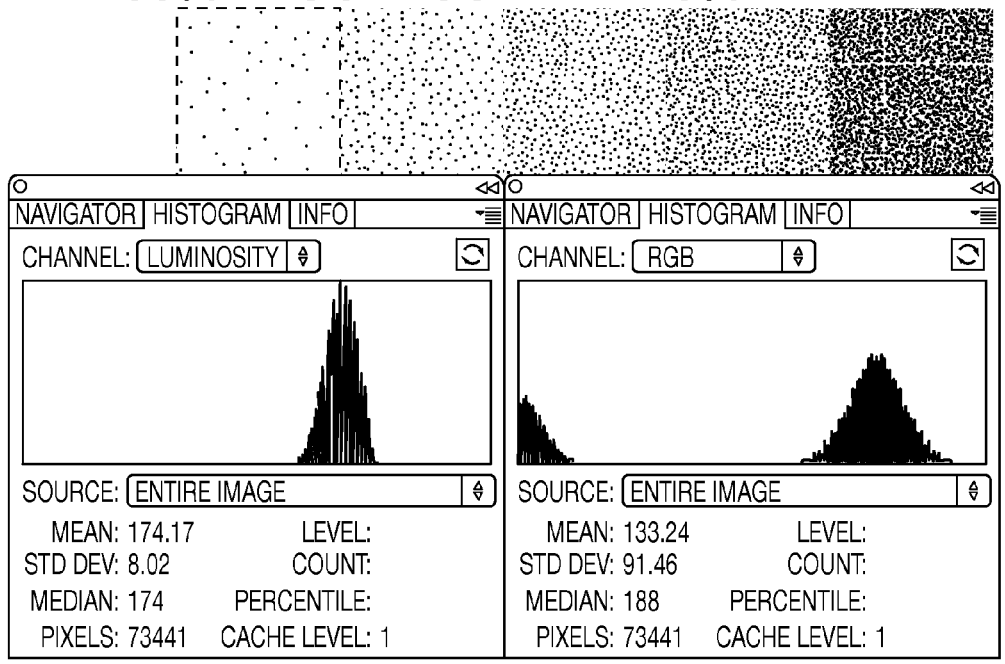
Figure 5C:
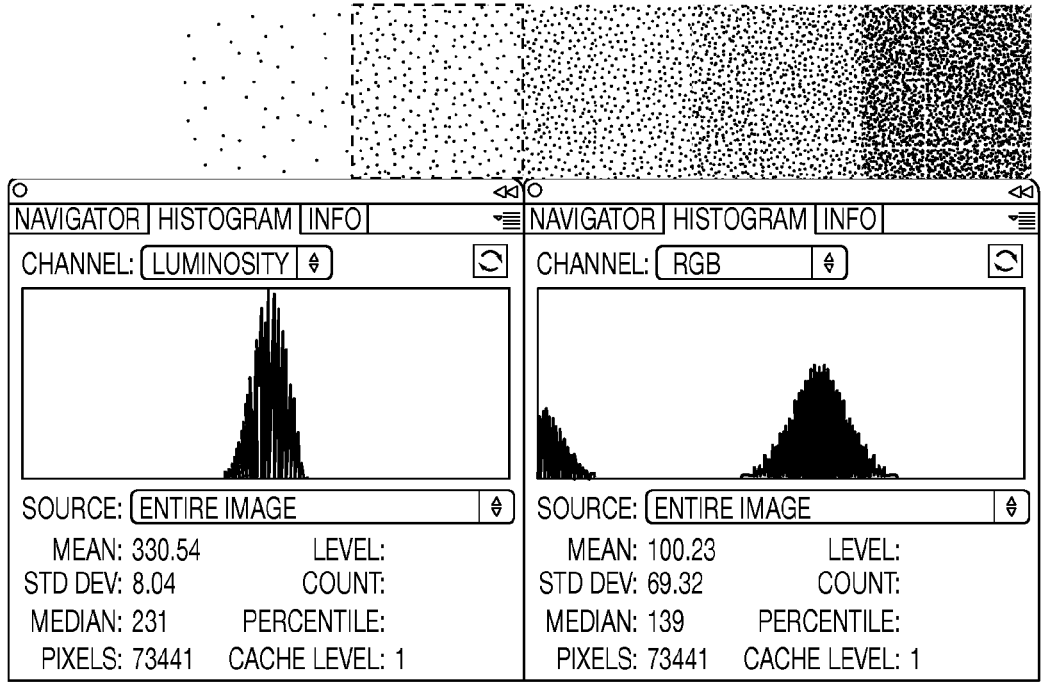
Figure 5D:
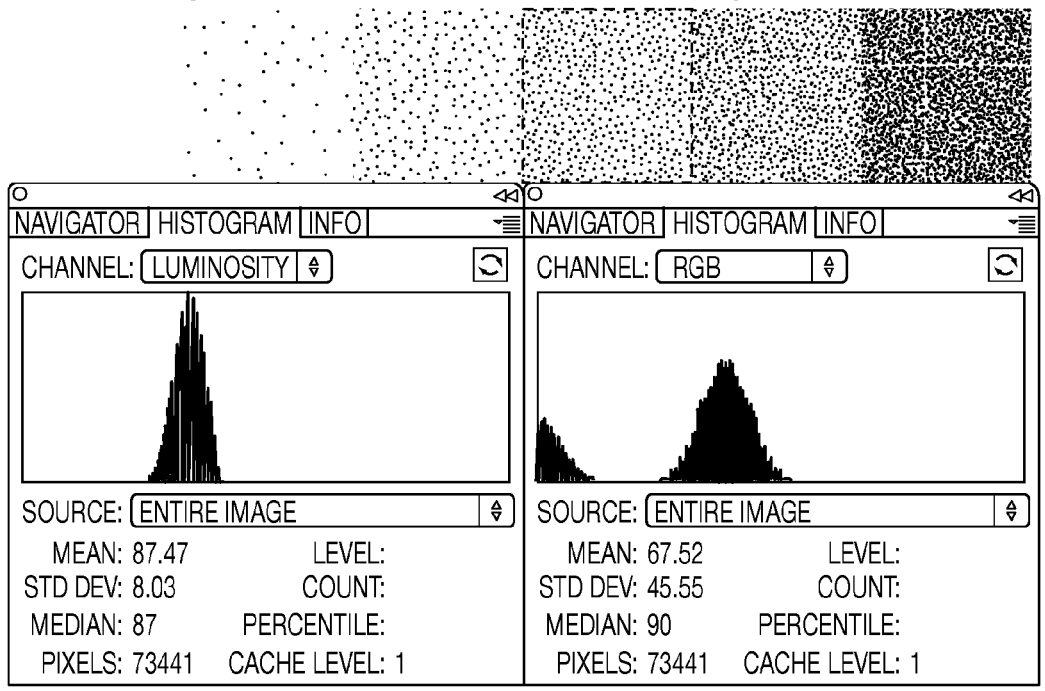
Figure 5E:
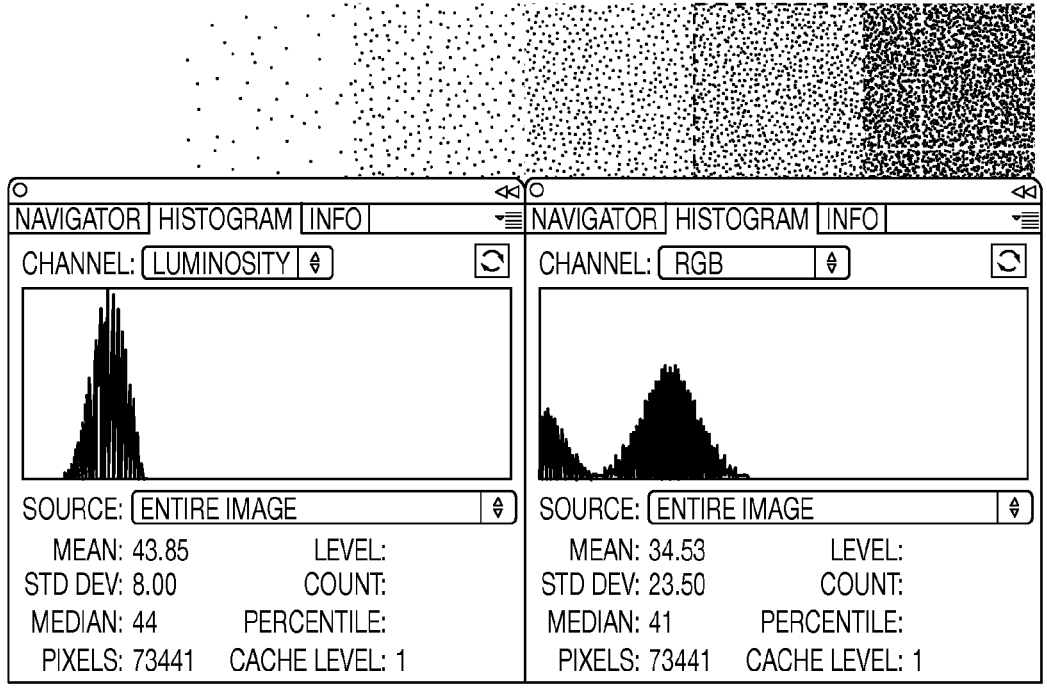
Figure 5F:
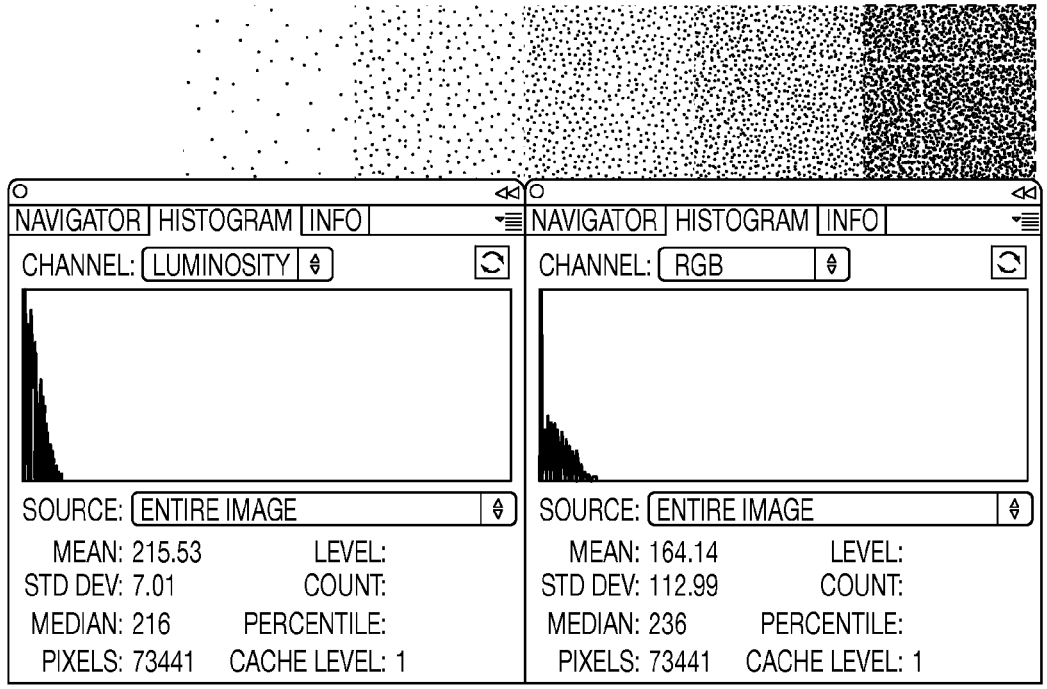
Figure 6A:
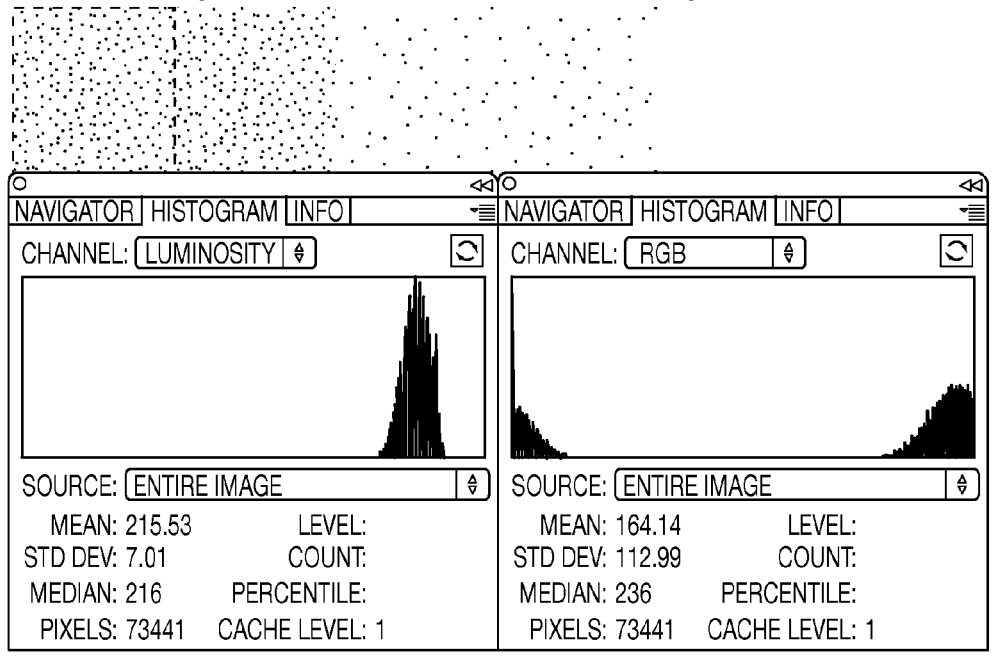
FIGS. 6a-6d show examples of invariant luminosity under dark lighting conditions with respect to different fluorescent and white color proportions.
Figure 6B:
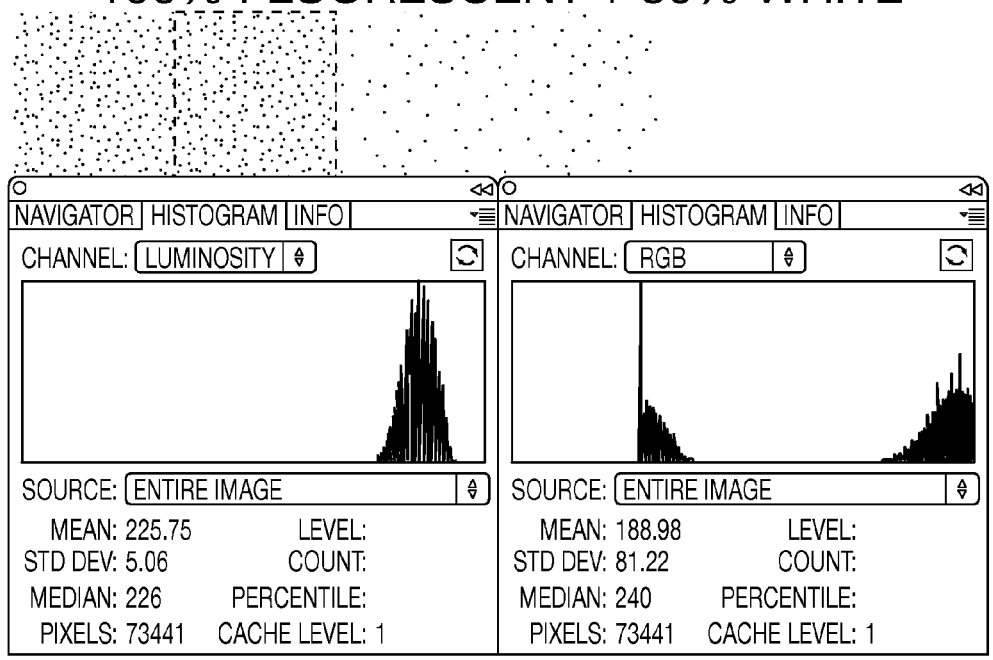
Figure 6C:
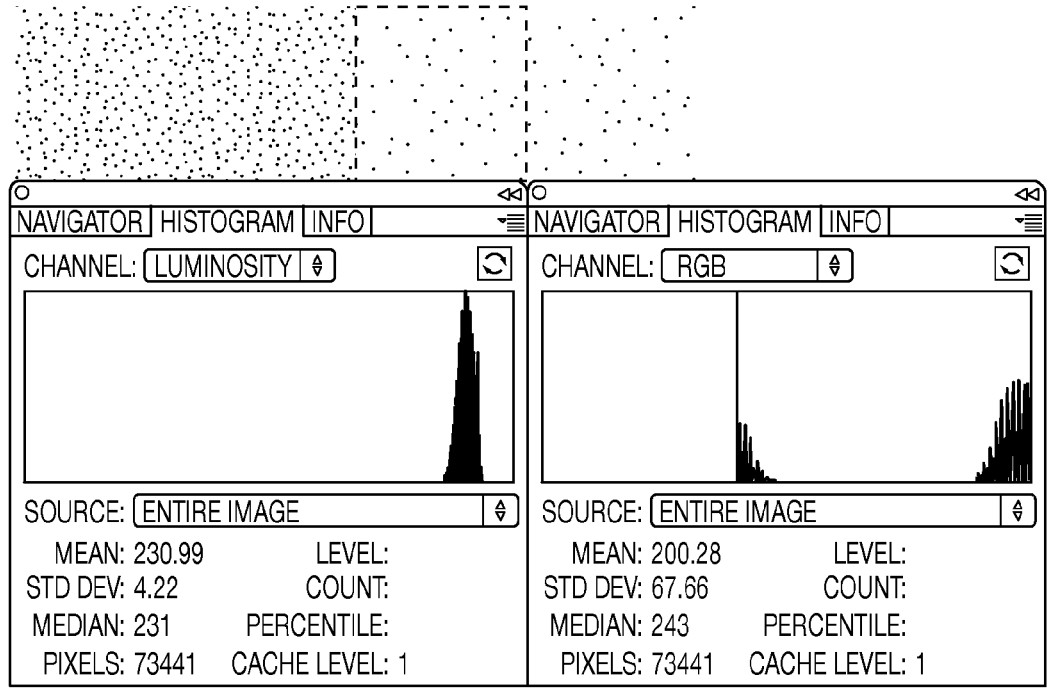
Figure 6D:
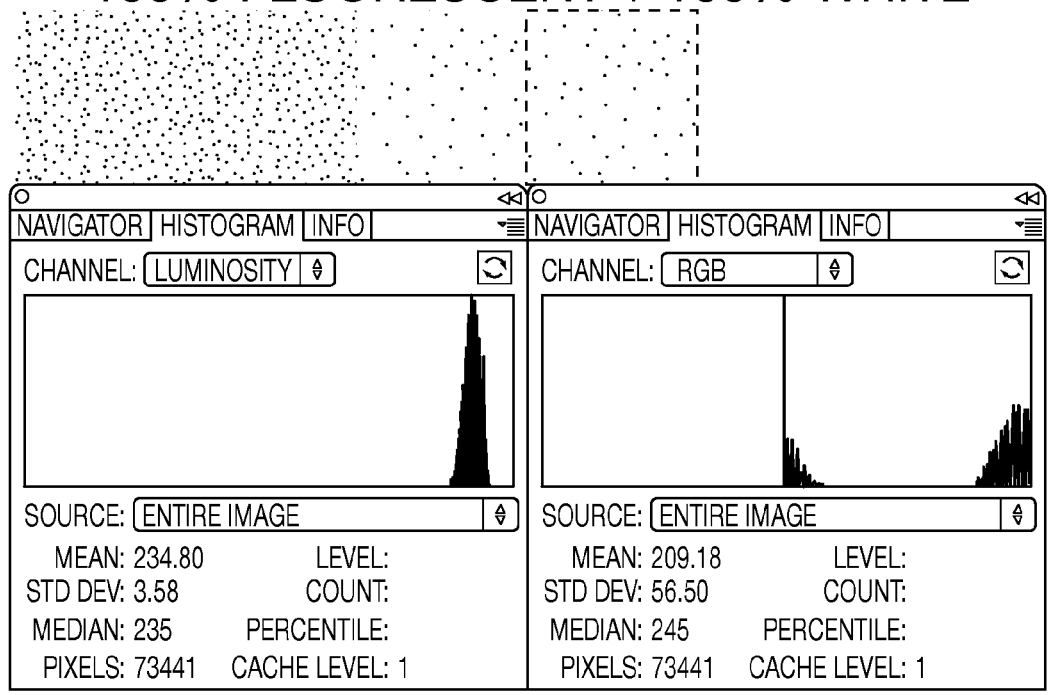

In FIGS. 3a-3f through FIGS. 6a-6d, the horizontal axis of the histograms are luminosity and the vertical axis are number of image pixels at the corresponding luminosity, with the luminosity starting at low values towards the left end of the diagrams and increasing to higher values towards the right end. Each sub-figure, for example, a, b, c, and the like, shows a particular proportion of a fluorescent color and a non-fluorescent color, in a progressive manner, along with the corresponding histograms. For example sub-FIG. 3a shows 100% fluorescent yellow color and 0% non-fluorescent yellow color, while sub-FIG. 3b shows 80% fluorescent yellow color and 20% non-fluorescent yellow color.

FIGS. 3a-3f show examples of invariant luminosity under daylight with respect to different fluorescent and non-fluorescent yellow (actual color not shown) color proportions. FIG. 3a shows an example fluorescent yellow color as 100% of the color mixture and non-fluorescent yellow color as 0% of the color mixture. As FIG. 3 is traversed from sub-FIG. 3a to sub-FIG. 3f, the invariance of luminosity of pixels becomes clear. That is, the same luminosity histogram is obtained regardless of the proportion of the mixed colors under the given lighting conditions.

FIGS. 4a-4d show examples of invariant luminosity under daylight with respect to different yellow fluorescent and white color proportions. As FIG. 4 is traversed from sub-FIG. 4a to sub-FIG. 4d, the invariance of luminosity of pixels becomes clear. That is, the same luminosity histogram is obtained regardless of the proportion of the mixed colors under the given lighting conditions.

FIGS. 5a-5f show examples of variable luminosity under dark lighting conditions with respect to different fluorescent and non-fluorescent yellow (actual color not shown) color proportions. In contrast to FIGS. 3 and 4, As FIG. 5 is traversed from sub-FIG. 5a to sub-FIG. 5f, the variation of luminosity of pixels becomes clear. That is, different luminosity histograms are obtained as the proportion of the mixed colors changes under the given lighting conditions. More specifically, in sub-FIG. 5a, luminosity histogram is towards the right end (more luminous) of the diagram, progressively moving towards the left (less luminous) as sub-FIGS. 5b to 5f are traversed.

FIGS. 6a-6d show examples of invariant luminosity under dark lighting conditions with respect to different fluorescent and white color proportions. As FIG. 6 is traversed from sub-FIG. 6a to sub-FIG. 6d, the invariance of luminosity of pixels becomes clear. That is, the same luminosity histogram is obtained regardless of the proportion of the mixed colors under the given lighting conditions. However, the standard deviation of the histogram is reduced in this traversal, showing less variation of luminosity when 100% of fluorescent color is maintained while increasing the proportion of white.

Figure 7:
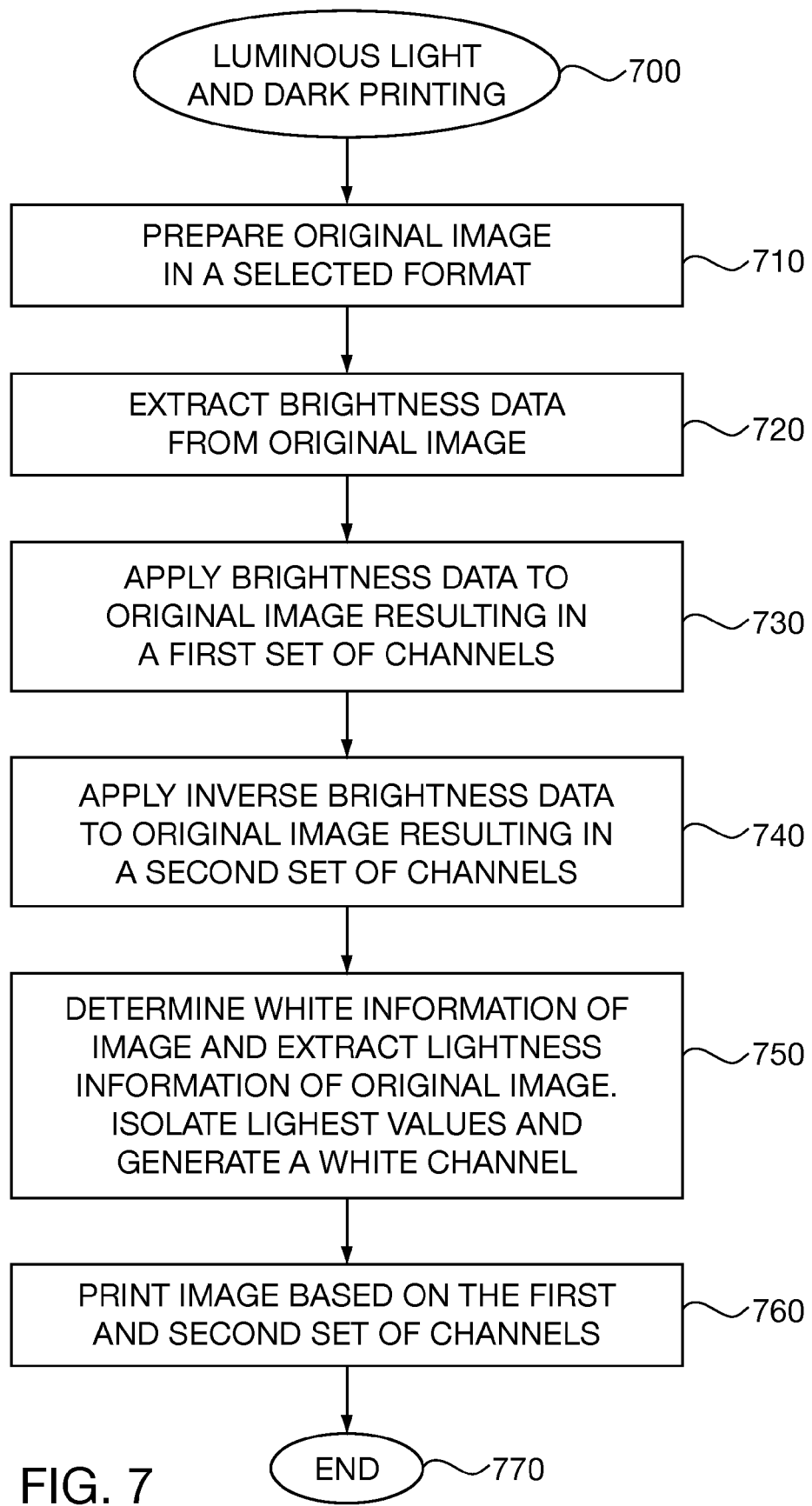
FIG. 7 is a flow diagram of an example process of luminous printing resulting in a printed image visible in daylight and under black light.

FIG. 7 is a flow diagram of an example process of luminous printing resulting in a printed image visible in daylight and under black light. To create an image, which looks substantially equivalent under normal daylight and under 345 to 400 nm black light, Process 700 may be used. The process proceeds to block 710 where a color format is selected for the representation of an original digitized image to be printed. For example, a CMYK format may be selected for the original image for further processing. The process proceeds to block 720.

At block 720, brightness data are extracted from the original image and used as further described below. In various embodiments, a broad process is utilized to separate the original image into multiple layers and associating a different set of color channels with each of the multiple layers. During printing, each of the multiple layers is printed using the corresponding set of color channels.

In various embodiments, the multiple layers include at least two layers, a first layer, Brightness layer (high brightness value), of the original image, and a second layer, a Darkness layer (low brightness value), of the original image. The resulting data are printed on a printing press to create a printed image with the desired characteristics, as further described below.

In various embodiments, depending on the format used a multi-color printing press is used. For example, with CMYK format, an 8-color printing press may be used with C, M, Y, K, Cf, Mf, Yf, Wi colors, where C, M, Y, and K are the CMYK format colors; Cf, Mf, Yf are fluorescent versions of the same colors; and Wi is White Invisible fluorescent color. The Darkness layer pixels are associated with and may be printed using C, M, Y, K colored ink, and the Brightness layer is associated with and may be printed using the Cf, Mf, Yf, Wi colored ink. The process proceeds to block 730.

At block 730, in various embodiments, the Brightness layer is generated by extracting the brightness information of the original image. The extracted data generally results in a grayscale image which describes the relative brightness of every pixel in the original image. In various embodiments, the extracted brightness data may be used as a mask to be applied to the original image to generate the brightness layer. Upon application of the brightness mask to the original image, a first set of channels is obtained including the colors to be used for printing the brightness layer. The first set of color channels may be assigned as: C=Cf, M=Mf, Y=Yf and K is deleted to be replaced later, as described below. The process proceeds to block 740.

At block 740, in various embodiments, an inverse of the brightness data extracted in block 720 is applied to the C, M, Y channels of the original image, resulting in the isolation of a darkness of the original image as the darkness layer associated with a second set of channels for printing the Darkness layer. The second set of color channels for this layer is assigned as: C=C, M=M, Y=Y and K=K, where the black channel (K) remains the same as the original image. The process proceeds to block 750.

At block 750, white information of the original image is determined to enable the printing of the image with Wi color. Lightness information of the image is extracted resulting in a grayscale image, which describes the relative lightness of every pixel. With this technique, the lightest, for example, "quarter tone," values of the original image are isolated. The resulting data is applied to the Wi channel. In various embodiments, the above procedures constitute the preprocessing of the original image prior to printing. The overall result of the above procedures is the creation of two layers, Brightness and Darkness layers, and eight color channels—C, M, Y, K, and Cf, Mf, Yf, Wi—divided into two sets of channels, one each for the printing of the Brightness and Darkness layers, respectively. The process proceeds to block 760.

At block 760, the data included in the Brightness and Darkness layers is transmitted to the printer, for example, via a computing device, to be printed using the two corresponding sets of color channels. In various embodiments, the image is printed in one pass, while in other embodiments, the image may be printed in multiple passes, for example, to perform additional filtering operations on the image to be printed.

The process terminates at block 770.

Figure 8:
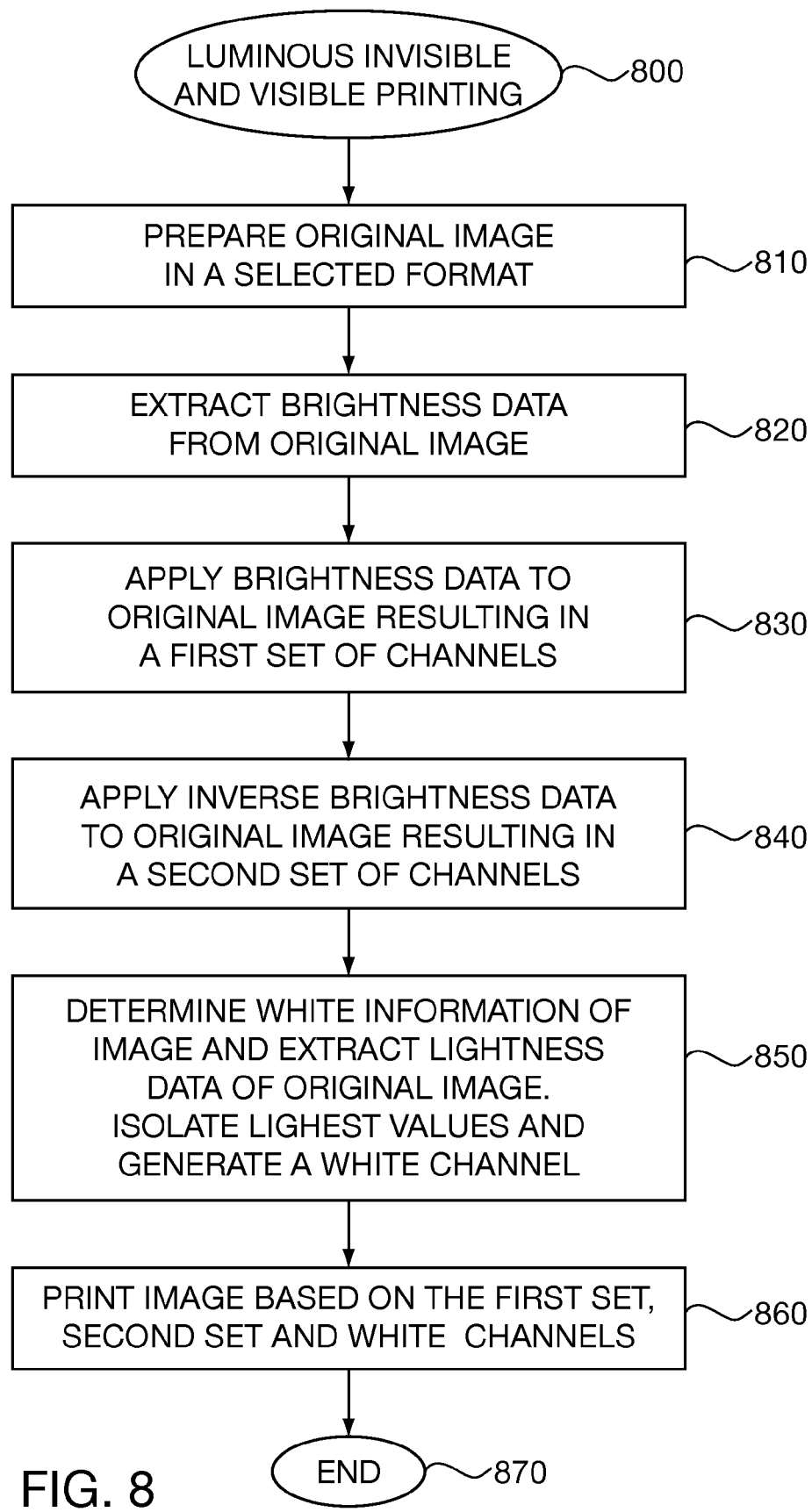
FIG. 8 is a flow diagram of an example process of luminous printing resulting in a printed image invisible in daylight and visible under black light.

FIG. 8 is a flow diagram of an example process of luminous printing resulting in a printed image invisible in daylight and visible under black light. More specifically, to create an image, which is substantially invisible under normal daylight and visible in substantially full and accurate color under 345 to 400 nm black light, process 800 may be used. The process proceeds to block 810 where a color format is selected for the representation of an original digitized image to be printed. For example, a CMYK format may be selected for the original image for further processing. The process proceeds to block 820.

At block 820, brightness data are extracted from the original image and used as further described below. In various embodiments, a broad two-step process is utilized. In the first step a first layer, Brightness layer (high brightness value), of the original image is created while in the second step a second layer, Darkness layer (low brightness value), of the original image is created. The resulting data are printed on a printing press to create a printed image with the desired characteristics.

In various embodiments, an 8 color printing press is used, with C, M, Y, K, Ci, Mi, Yi, Wi colors, where C, M, Y, and K are the CMYK format colors; Ci, Mi, Yi are Invisible fluorescent versions of the same colors; and Wi is White Invisible fluorescent color. The Darkness layer pixels may be printed using C, M, Y, K colored ink, and the Brightness layer may be printed using the Ci, Mi, Yi, Wi colored ink. The process proceeds to block 830.

At block 830, in various embodiments, the Brightness layer is generated by extracting the brightness information of the original image. The extracted data generally results in a grayscale image which describes the relative brightness of every pixel in the original image. The extracted brightness data is applied to the original image as a mask on a pixel-by-pixel basis. In various embodiments, the brightness data may be used as a mask to be applied to the original image. Upon application of the brightness mask to the original image, a first set of channels is obtained including the colors to be used for printing the brightness layer. The first set of color channels may be assigned as: C=Ci, M=Mi, Y=Yi and K is deleted to be replaced later, as described below. The process proceeds to block 840.

At block 840, in various embodiments, an inverse of the brightness data extracted in block 820 is applied to the C, M, Y channels of the original image, resulting in the isolation of a darkness of the original image as a second set of channels for printing the Darkness layer. The second set of color channels for this layer is assigned as: C=C, M=M, Y=Y and K=K, where the black channel (K) remains the same as the original image. The process proceeds to block 850.

At block 850, white information of the original image is determined to enable the printing of the image with Wi color. Lightness information of the image is extracted resulting in a grayscale image, which describes the relative lightness of every pixel. With this technique, the lightest, for example, "quarter tone," values of the original image are isolated. The resulting data is applied to the Wi channel. In various embodiments, the above procedures constitute the preprocessing of the original image prior to printing. The overall result of the above procedures is the creation of two layers, Brightness and Darkness layers, and eight color channels—C, M, Y, K, and Ci, Mi, Yi, Wi—divided into two sets of channels, one each for the printing of the Darkness and the Brightness layers, respectively. Ki (Black Invisible) may be used as one of the color channels. Ki absorbs black light when applied over a fluorescent substrate and will appear black under black light. The process proceeds to block 860.

At block 860, the data included in the Brightness and Darkness layers is transmitted to the printer, for example, via a computing device, to be printed using the two corresponding sets of color channels. In various embodiments, the image is printed in one pass, while in other embodiments, the image may printed in multiple passes, for example, to perform additional filtering operations on the image to be printed.

The process terminates at block 870.

Invisible fluorescent ink are "clear" inks that when printed are substantially invisible under normal daylight but appear in substantially full and accurate color under UV black light.

Figure 9:
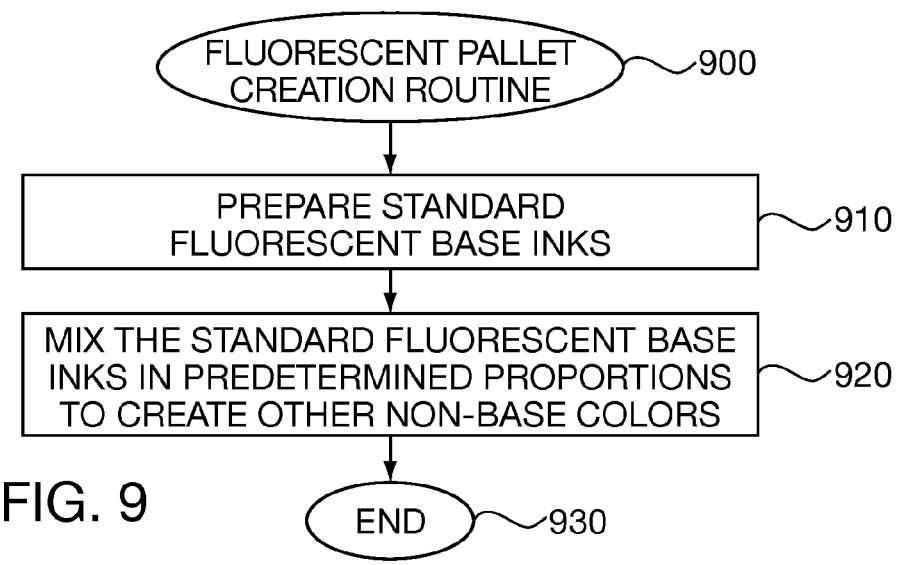
FIG. 9 is a flow diagram of an example process of creation of a pallet of fluorescent colors using base fluorescent colors.

FIG. 9 is a flow diagram of an example process of creation of a pallet of fluorescent colors using base fluorescent colors. Process 900 proceeds to block 910 where a set of standard fluorescent inks and/or colors is prepared for use. The process proceeds to block 920.

At block 920, the standard fluorescent base colors are mixed in predetermined proportions to create other non-base fluorescent colors. This way color separation may be effected by digitally mixing fluorescent colors to create the full pallet of fluorescent colors. The use of standard fluorescent colors results in printed image being visible in a color accurate manner under both normal daylight and UV black light. Using invisible or clear fluorescent inks, the printed image will substantially not be visible under normal daylight but will substantially appear in full color under UV black-light.

For example, given the base colors—fluorescent cyan, fluorescent yellow and fluorescent magenta, 100% fluorescent yellow and 100% fluorescent magenta may be mixed to create fluorescent red. Similarly, 100% fluorescent yellow and 25% fluorescent magenta may be digitally mixed to create fluorescent orange.

The process proceeds to block 930 and terminates.

Figure 10:
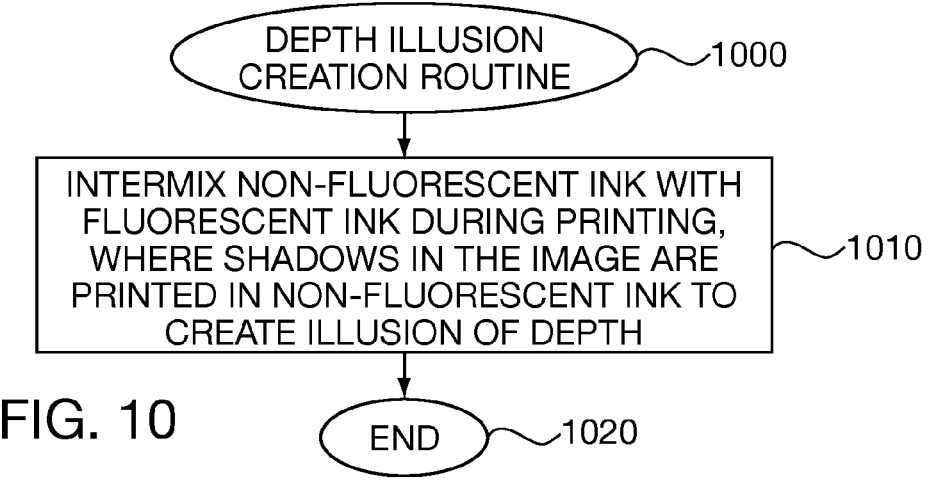
FIG. 10 is a flow diagram of an example process of creation of illusion of depth using fluorescent and non-fluorescent colors.

FIG. 10 is a flow diagram of an example process of creation of illusion of depth using fluorescent and non-fluorescent colors. Process 1000 proceeds to block 1010, where non-fluorescent ink is intermixed with fluorescent ink during printing to create the illusion of depth in the printed image. To create lesser degrees of fluorescence, non-fluorescent inks may be intermixed with fluorescent inks. The addition of non-fluorescent cyan, magenta, yellow and black, to the extent to which they are added to the fluorescent ink, creates an effect of comparative darkness under UV black light. For example, a subject image may be printed in fluorescent ink, and any shadows in the subject image may be printed in non-fluorescent color to create the illusion of depth.

The process proceeds to block 1020 and terminates.

Figure 11:
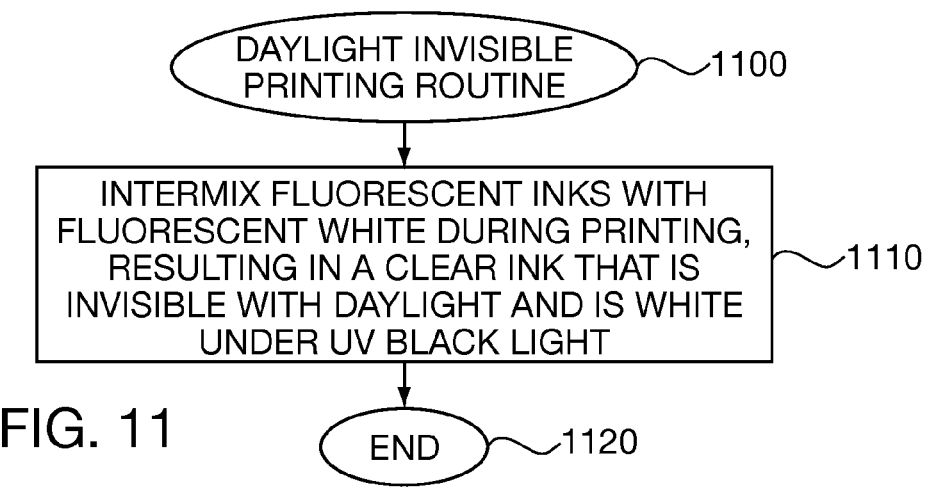
FIG. 11 is a flow diagram of an example process of creation of a printed white color that is invisible in daylight and visible as white color under black light.

FIG. 11 is a flow diagram of an example process of creation of a printed white color that is invisible in daylight and visible as white color under black light. Process 1100 proceeds to block 1110, where fluorescent inks are mixed with fluorescent white during printing to create a printed image that is substantially invisible in normal daylight and is white under UV black light. To create lesser degrees of fluorescence, it is also possible to intermix a single UV light inhibiting clear ink, which substantially completely absorbs UV light frequency and substantially negates the propensity of fluorescent ink to fluoresce.

To create a fluorescent highlight effect, fluorescent inks may be mixed with fluorescent white. This mixture creates a clear ink, which is invisible under normal daylight and is white under UV black-light.

The process proceeds to block 1120 and terminates.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

The above specification, examples, and data provide a complete description of the manufacture and use of the composition of the invention. Since many embodiments of the invention can be made without departing from the spirit and scope of the invention, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A method of printing images, the method comprising:
   separating an original image comprising a set of original channels corresponding to color formats into multiple layers by a computing device, the layers being distinct from color formats;
   associating a different set of channels corresponding to the color formats with each of the multiple layers, wherein the different set of channels are configured to be used to generate a printed image that looks substantially equivalent under daylight conditions and Ultra Violate (UV) black light conditions;
   wherein separating the original image into multiple layers comprises separating the original image into two layers including a brightness layer and a darkness layer;
   wherein separating the original image into two layers comprises:
   extracting brightness information from the original image to obtain a grayscale image mask;
   applying the grayscale image mask to the original image to generate the brightness layer and determine a first set of channels associated with the brightness layer;
   determining an inverse of the brightness information from the original image; and
   applying the inverse of the brightness information from the original image to each channel of the set of original channels of the original image to generate the darkness layer and a second set of channels associated with the darkness layer; and
   printing the brightness layer and the darkness layer using the first set of channels and the second set of channels.

2. The method of Claim 1, wherein the color format comprises CMYK (Cyan, Magenta, Yellow, and blacK).

3. The method of claim 1, wherein the different set of channels comprise fluorescent and non-fluorescent color channels.

4. The method of claim 3, wherein one of the different set of channels comprises cyan, magenta, yellow and black colors, and another one of the different set of channels comprises fluorescent cyan, fluorescent magenta, fluorescent yellow, and invisible white.

5. A method of printing images, the method comprising:
   separating an original image comprising a set of original channels corresponding to color formats into multiple layers by a computing device, the layers being distinct from color formats;
   associating a different set of channels corresponding to the color formats with each of the multiple layers, wherein the different set of channels are configured to be used to generate a printed image that is substantially invisible under normal daylight and visible in substantially full and accurate color under Ultra Violate (UV) black light;

wherein separating the original image into multiple layers comprises separating the original image into two layers including a brightness layer and a darkness layer;

wherein separating the original image into two layers comprises:

extracting brightness information from the original image to obtain a grayscale image mask;

applying the grayscale image mask to the original image to generate the brightness layer and determine a first set of channels associated with the brightness layer;

determining an inverse of the brightness information from the original image; and applying the inverse of the brightness information from the original image to each channel of the set of original channels of the original image to generate the darkness layer and a second set of channels associated with the darkness layer; and printing the brightness layer and the darkness layer using the first set of channels and the second set of channels.

6. The method of Claim 5, wherein the color format comprises CMYK (Cyan, Magenta, Yellow, and blacK).

7. The method of claim 6, wherein the first set of channels comprises invisible fluorescent cyan, invisible fluorescent magenta, invisible fluorescent yellow and invisible white colors, and the second set of channels comprises cyan, magenta, yellow, and black.

8. A printing system comprising:

a printing press configured to print images; and a computing device coupled with the printing press, wherein the computing device is configured to digitally separate an original image comprising a set of original channels corresponding to color formats into multiple layers, the layers being distinct from color formats, associate a different set of channels corresponding to the color formats with each of the multiple layers, wherein the different sets of channels are configured to be used to generate a printed image that looks substantially equivalent under daylight conditions and Ultra Violate (UV) black light conditions, wherein computing device is configured to separate the original image into multiple layers comprises separating the original image into two layers including a brightness layer and a darkness layer;

wherein separating the original image into two layers comprises:

extracting brightness information from the original image to obtain a grayscale image mask;

applying the grayscale image mask to the original image to generate the brightness layer and determine a first set of channels associated with the brightness layer;

wherein computing device is configured to determine an inverse of the brightness information from the original image; and apply the inverse of the brightness information from the original image to each channel of the set of original channels of the original image to generate the darkness layer and a second set of channels associated with the darkness layer; and wherein computing device is configured to print the brightness layer and the darkness layer using the first set of channels and the second set of channels.

9. The method of claim 8, wherein the color format of the set of original channels of the original image comprises CMYK (Cyan, Magenta, Yellow, and blacK).

10. The printing system of claim 8, wherein the brightness layer is associated with a first set of channels comprising fluorescent cyan, fluorescent magenta, fluorescent yellow and invisible white colors, and the darkness layer is associated with a second set of channels comprising cyan, magenta, yellow, and blacK colors.

* * * * *